United States Patent [19]
Bell et al.

[11] Patent Number: 5,917,997
[45] Date of Patent: *Jun. 29, 1999

[54] HOST IDENTITY TAKEOVER USING VIRTUAL INTERNET PROTOCOL (IP) ADDRESSING

[75] Inventors: Jon Anthony Bell, Raleigh; Edward Glen Britton, Chapel Hill, both of N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,469

[22] Filed: Dec. 6, 1996

[51] Int. Cl.⁶ ...................................... G06F 11/00
[52] U.S. Cl. ................ 395/182.02; 395/182.09; 395/200.68
[58] Field of Search ........................ 395/182.02, 182.08, 395/182.09, 182.13, 182.14, 182.18, 182.17, 200.5, 200.51, 200.53, 200.68, 200.69, 182.1, 200.31, 200.75

[56] References Cited

U.S. PATENT DOCUMENTS

| | | | |
|---|---|---|---|
| 5,134,712 | 7/1992 | Yamamoto | 395/182.11 |
| 5,148,433 | 9/1992 | Johnson et al. | 395/182.08 |
| 5,157,663 | 10/1992 | Major et al. | 395/182.08 |
| 5,168,443 | 12/1992 | McLaughlin et al. | 395/182.09 |
| 5,398,329 | 3/1995 | Hirata et al. | 395/182.09 |
| 5,408,649 | 4/1995 | Beshears et al. | 395/182.08 |
| 5,473,599 | 12/1995 | Li et al. | 395/182.11 |
| 5,566,297 | 10/1996 | Devarakonda et al. | 395/182.11 |
| 5,592,611 | 1/1997 | Midgely et al. | 395/182.02 |
| 5,604,862 | 2/1997 | Midgely et al. | 395/182.04 |
| 5,623,625 | 4/1997 | Thompson et al. | 395/182.02 |
| 5,633,999 | 5/1997 | Clowes | 395/182.04 |
| 5,636,371 | 6/1997 | Yu | 395/500 |
| 5,675,723 | 10/1997 | Ekrot et al. | 395/182.02 |
| 5,774,660 | 6/1998 | Brendel et al. | 395/200.31 |

OTHER PUBLICATIONS

Bhide et al., "Implicit Replication in a Network File Server" IEEE, pp. 85–90, Mar. 1990.

Bhide et al., "A Highly Available Network File Server", USENIX, IEEE, pp. 199–205, 1991.

Huang et al., "Resource Allocation for Primary Site Fault Tolerant Systems", IEEE Trans. on Software Engineering, vol. 19, No. 2, pp. 108–119, Feb. 1993.

*Primary Examiner*—Joseph E. Palys
*Attorney, Agent, or Firm*—Jeanine S. Ray-Yarletts

[57] ABSTRACT

In a telecommunications system containing more than one host computer and multiple real connections to the telecommunications network, an apparatus, method and system for allowing transmission to the dynamic reassignment of sessions from a failing host to an alternate or backup host computer without requiring changes to the devices or addresses of devices connecting to the host.

17 Claims, 4 Drawing Sheets

HOST IDENTITY TAKEOVER USING VIRTUAL INTERNET PROTOCOL (IP) ADDRESSING

RELATED APPLICATIONS

There is a related application Ser. No. 02/755,420 entitled Virtual Internet Protocol Addressing filed on Nov. 22, 1996 by the same parties.

BACKGROUND OF THE INVENTION

TCP/IP (Transmission Control Protocol/Internet Protocol) is the transport mechanism underlying the Internet. It is also the underlying protocol for many intranets and business applications in existence today. TCP/IP was started as an educational and scientific network. It was not designed to handle high-volume traffic with the requirement of availability 7 days per week, 24 hours per day. TCP/IP was designed primarily as a fast transport mechanism. Because of this design point, there were few backup or redundancy measures incorporated into TCP/IP.

Through the growth of the Internet, which includes the world wide web, requirements have arisen for higher availability and greater reliability for host TCP/IP networks. This has become especially true where the TCP/IP host controls business applications or transactions. The design of TCP/IP is such that each physical network interface adapter has associated with it an address. This address is unique within the entire network and is the method by which all other devices communicate with the adapter or the devices connected through the adapter. If a given TCP/IP host having a particular adapter address should fail, the users communicating with the host cannot dynamically switch to using a host that contains redundant information since they must address the system using the interface adapter address. The user must change the reference to use the new or alternate host which is a manual process.

The methods available in the current art to rectify this problem are: (1) to have the network operators notify each of the end users of the IP address of the alternate adapter on the alternate host and the end users could request reconnection with the new IP address; (2) if the customers were using the Domain Name Server (DNS), the administrator could change the name-to-address mapping on the DNS, but these are normally over night administrative batch processes and many clients either do not use DNS or do not update cached name-to-address mappings frequently; or, (3) the user could install a new real physical network interface adapter card on the alternate host and configure it with the IP address of the failed adapter on the initial host, but the cost and time involved with this alternative makes it prohibitive for all except the most catastrophic of host failures.

SUMMARY OF THE INVENTION

The present invention involves a method and a system for allowing the network administrator to establish TCP connections using a Virtual Internet Protocol Address, which is not associated with a physical adapter, such that if the host associated with the virtual IP address fails or is brought down, the operator of a backup host can dynamically configure that same virtual IP address to reside on the backup host.

DETAILED DESCRIPTION OF THE PREFERRED EMBODIMENT

The preferred embodiment of the present invention is implemented in, but not limited to, an IBM MVS host running the TCP/IP protocol. It allows for an IP address that selects a TCP/IP stack (and an MVS image if there is only one stack on the MVS image) without selecting a specific network device or attachment. Other hosts that connect to MVS TCP/IP applications can send data to the MVS virtual IP address via whatever paths are selected by the routing protocols. Should the host upon which the virtual IP address reside fail, then the virtual IP address can be configured by a systems administrator to reside on a backup host. The dynamic routing protocols currently implemented in TCP/IP will then propagate the route to this virtual IP address to all of the routers in the network. The applications using this virtual IP address will then continue to process using the backup host.

Figure 1:
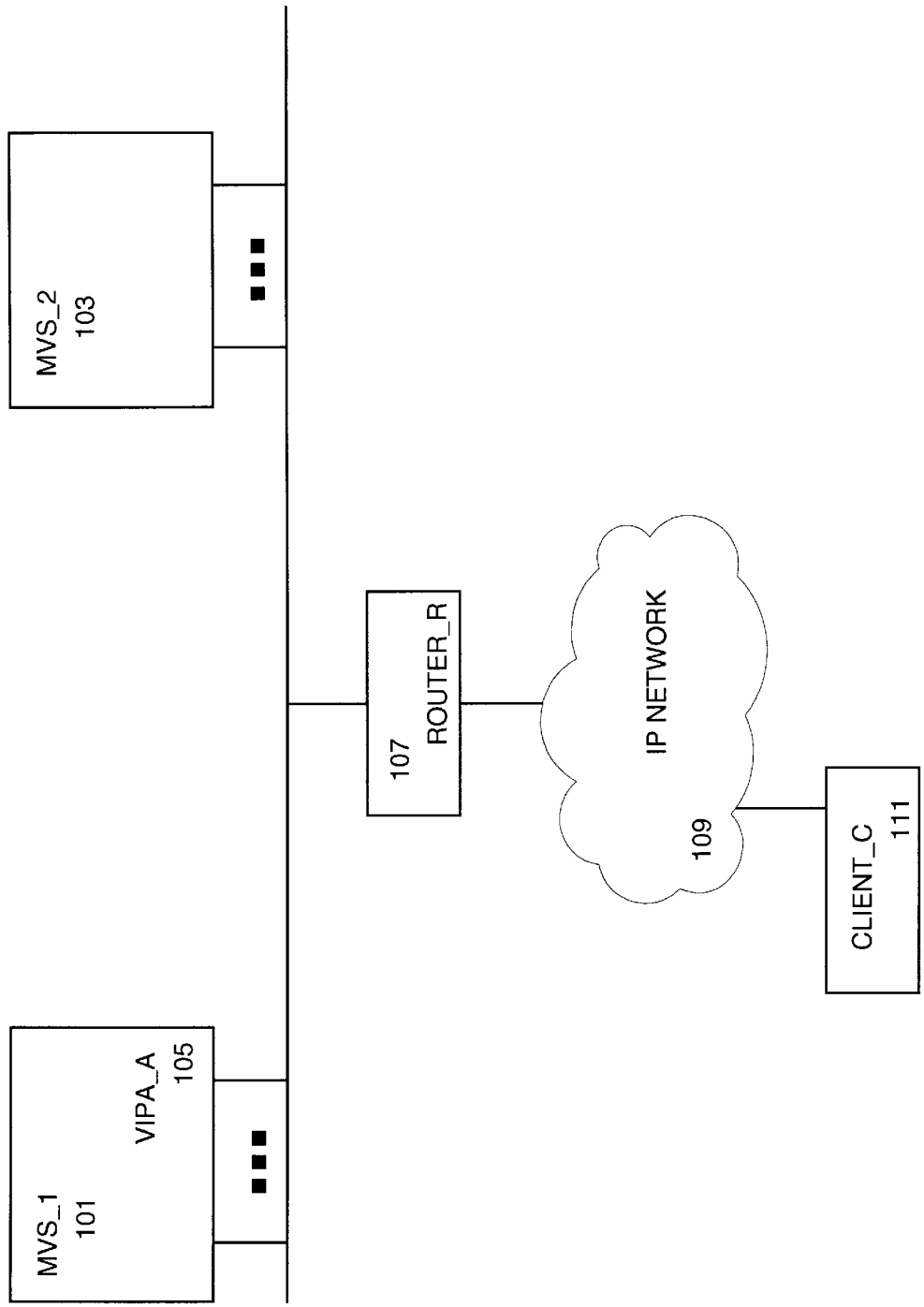
FIG. 1 depicts a representative network prior to a host identity takeover.

FIG. 1 is a representative example of a network prior to a host identity takeover. Host MVS_1 (101) contains a virtual IP address (VIPA) called VIPA_A (105), along with one or more real physical links to a network. The network in the present example connects to a router, ROUTER_R (107). Host MVS_2 (103) does not contain VIPA address VIPA_A, although it may contain other VIPA addresses. A given virtual IP address, such as VIPA_A, must be unique in a network at any given time. In the present example, MVS_2 has one or more real physical network interfaces to a network that directly connects to the router, ROUTER_R (107). In general, MVS_2 need not connect directly to the same router to which MVS_1 connects, it can connect to any router in the network. ROUTER_R (107) connects to an arbitrary IP network (109) to which the clients, such as Client_C (111), also connect.

Figure 2:
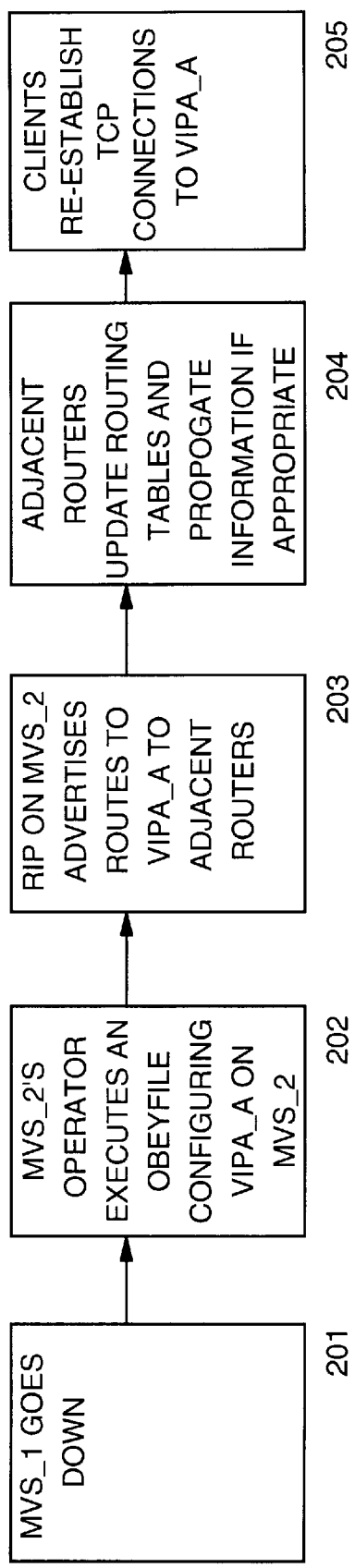
FIG. 2 demonstrates the logical flow of the backup process.

FIG. 2 depicts the process for host identity takeover when the host MVS_S (101) is taken down or fails (201). When the operator of an alternate host, in this case MVS_2 (103), learns that the original host, MVS_1 (101) has stopped working or has been taken out of service, he dynamically configures the VIPA address (VIPA_A) which previously resided on host MVS_1 to now reside on MVS_2. In the MVS TCP/IP of the preferred embodiment this is done by executing an OBEYFILE (202) that includes HOME, BSDROUTING PARMS, DEVICE and LINK statements for VIPA_A. To learn more about these parameters, refer to the IBM TCP/IP 3.1 for MVS Customization and Administration Guide, IBM order number SC31-7134-02. A dynamic route update protocol, such as RIP (the Routing Information Protocol) then advertises routes to VIPA_A (203) to all routers directly connected to MVS_2. These routers update their routing tables with the new routes and, if appropriate, further advertise (204) the new routes to the desired virtual IP address (VIPA_A) to adjacent routers. After the new routes to VIPA_A have been propagated throughout the network, the clients in the network, such as Client_C (111), re-establish their TCP connections to VIPA_A (205). The routers will then route all of the traffic for the address VIPA_A to the host MVS_2.

Figure 3:
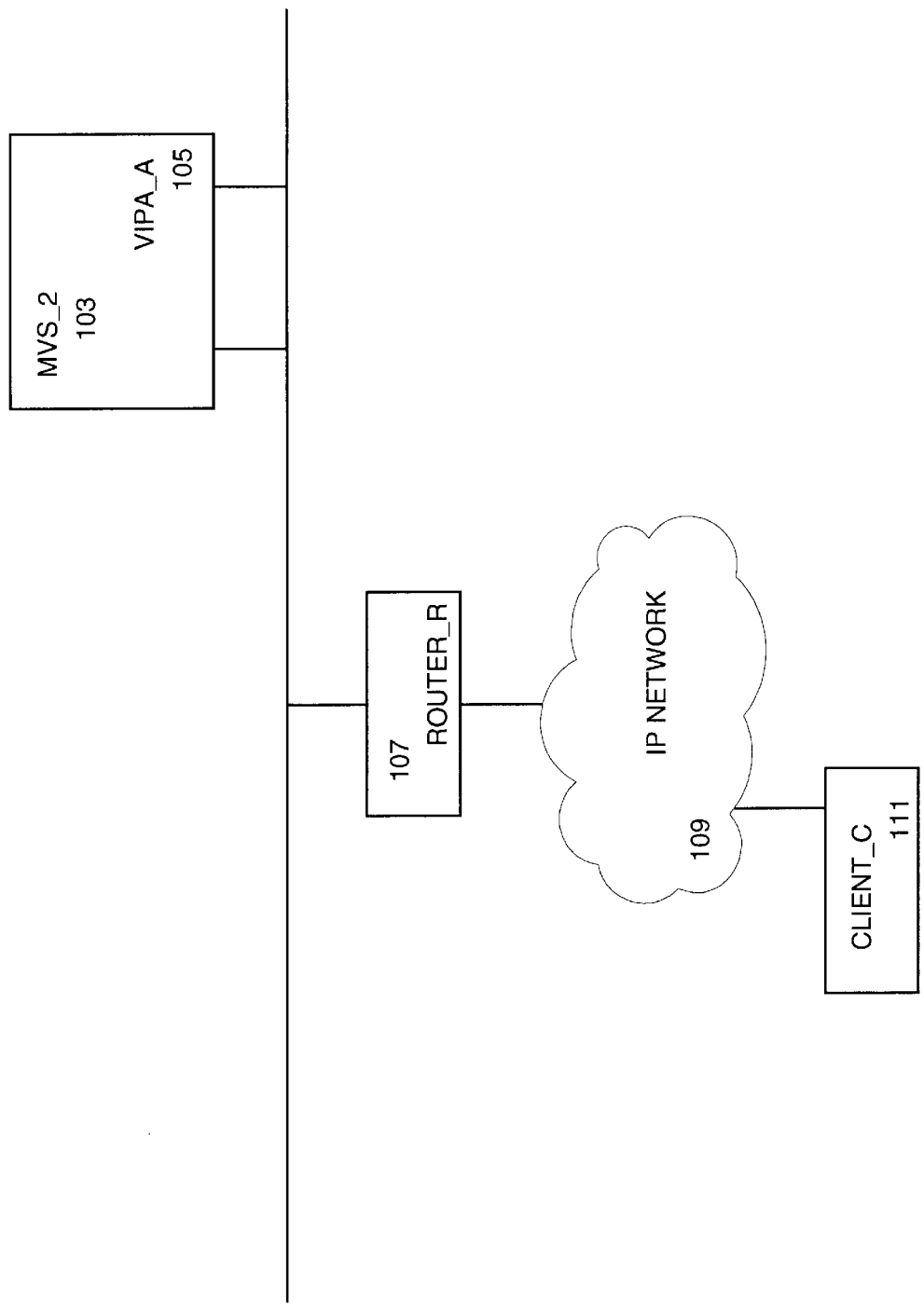
FIG. 3 depicts a representative network after host identity takeover has occurred.

FIG. 3 depicts the network of FIG. 1 after MVS_1 (101) has failed or been taken out of service and MVS_2 (103) has taken over the identity of MVS_1 (101) by the process illustrated in FIG. 2. VIPA_A now resides in MVS_2 (103) and MVS_1 (101) is effectively removed from the TCP/IP network. Client_C (111) has re-established its TCP/IP connection with VIPA_A (105) which now resides on MVS_2 (103).

Figure 4:
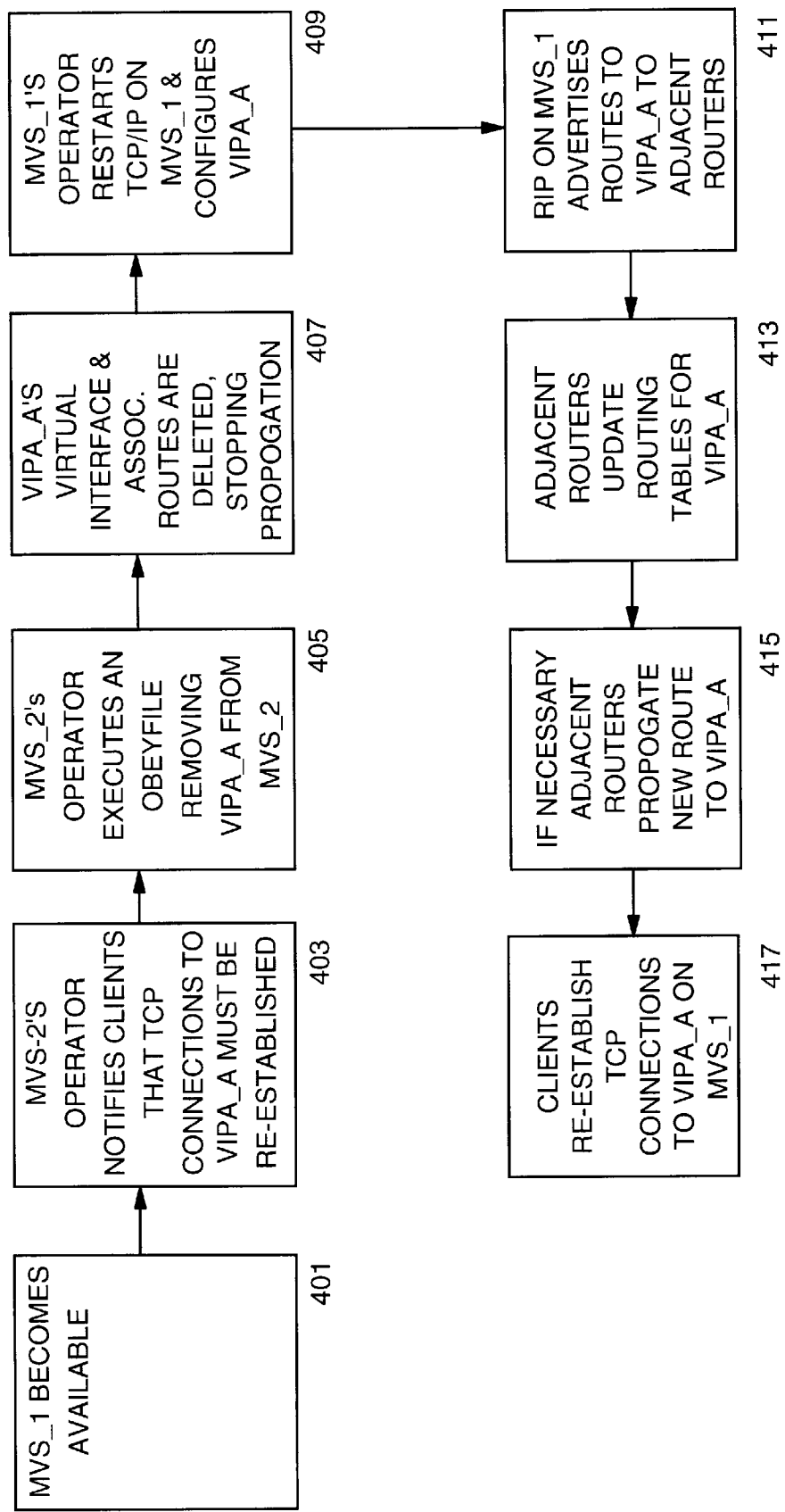
FIG. 4 demonstrates the logical flow of the restoration process.

FIG. 4 is a logical flow of the procedure for restoring the identity of the original host in the preferred embodiment. In the figures of the present invention, this is the restoration of the identity of host MVS_1 when it is returned to service in the TCP/IP network. When MVS_1 becomes available (401), the operator of MVS_2 notifies the clients which have TCP/IP connections to VIPA_A that those connections will need to be reestablished (403). Then the operator of MVS_2 removes VIPA_A from the configuration file of MVS_2 (405). In the preferred embodiment, this is done by executing an OBEYFILE that omits VIPA_A from the HOME list and the BSDROUTINGPARMS. VIPA_A's virtual interface and its associated routes are deleted (407), which stops the propagation of information indicating that VIPA_A resides on MVS_2. MVS_1's operator then restarts TCP/IP on MVS_1 and configures VIPA_A to reside on MVS_1 (409). Once this is accomplished, a dynamic routing protocol (RIP in the preferred embodiment) advertises the routes to VIPA_A residing on MVS_1 to its adjacent routers (ROUTER_R in FIG. 1) (411). The adjacent routers to MVS_1 update their routing tables for VIPA_A (413) and propagate the new route to VIPA_A to adjacent routers as necessary (415). Finally, clients re-establish TCP connections to VIPA_A on MVS_1 (417). At this point the network has been restored to the condition that it was in prior to the failure of MVS_1.

The present invention allow for one host to provide a responsive backup to the TCP/IP communications network without having to modify the applications using the host. The ability to reroute network traffic for applications from one host to another host without any changes to the applications themselves provides significant savings in hardware, software and time.

What is claimed is:

1. A computer network enabling one or more host computers to provide backup functions for TCP/IP communications, said computer network comprising:

a first host computer containing one or more network attachment devices and executing one or more applications, said first host computer containing a first virtual IP address (VIPA) by which other remote computers in the network can access said one or more applications residing on said first host computer, wherein said first VIPA is not associated with a physical adapter in said first host computer and wherein said first VIPA is uniquely associated with said first host computer at a given time;

a second host computer containing one or more network attachment devices and for executing one or more applications, said second host computer capable of defining a virtual IP address (VIPA) by which said other remote computers in the network can access said one or more applications residing on said second host computer;

an instance of one or more applications residing on said first host computer and also residing on said second host computer; and a first host identity takeover facility operating in said second host computer whereby, should said first host computer fail or be taken out of service, a first user of said first facility defines said first virtual IP address (VIPA) to be uniquely associated with said second host computer instead of said first host computer, thereby allowing said other remote computers to dynamically reroute access to said instance of said one or more applications residing on said first host computer to said second host computer without requiring a change to said instance or to a corresponding application executing on said other remote computers.

2. The computer network as claimed in claim 1 whereby, when said first host computer recovers, said first user of said first facility in said second host computer removes the definition of said first virtual IP address (VIPA) from said second host computer.

3. The computer network as claimed in claim 2 whereby, when said first user of said first facility in said second host computer removes the definition of said first virtual IP address (VIPA), a second user of a second host identity takeover facility operating in said first host computer defines said first virtual IP address (VIPA) to be uniquely associated with said first host computer instead of said second host computer, such that said other remote computers can resume communications with said instance of said one or more applications residing on said first computer.

4. The computer network as claimed in claim 1 wherein an OBEYFILE command is used to define said first virtual IP address (VIPA) to be uniquely associated with said second host computer.

5. The computer network as claimed in claim 2 or 3 wherein an OBEYFILE command is used to remove said definition of said first virtual IP address (VIPA) in said second host computer.

6. The computer network as claimed in claim 1, 2 or 3 wherein said first host computer contains multiple virtual IP addresses (VIPAs).

7. The computer network as claimed in claim 1, 2 or 3 wherein said second host computer contains multiple virtual IP addresses (VIPAs).

8. The computer network as claimed in claim 1, 2 or 3 wherein a TCP/IP routing protocol advertises a route to said first virtual IP address (VIPA).

9. For use in a computer network having at least two host computers and one or more remote computers, a means for enabling the host computers to provide backup functions for TCP/IP communications, said means for enabling comprising:

programmable means for defining a first virtual IP address (VIPA) on a first host computer containing one or more network attachment devices and executing one or more applications, said means for defining enabling said one or more remote computers to access said one or more applications residing on said first host computer by reference to said first virtual IP address (VIPA), wherein said first VIPA is not associated with a physical adapter in said first host computer and wherein said first VIPA is uniquely associated with said first host computer at a given time;

programmable means for defining a virtual address (VIPA) on a second host computer containing one or more network attachment devices and for executing one or more applications, whereby said one or more remote computers in the network can access said one or more applications residing on said second host computer by reference to said virtual IP address (VIPA);

an instance of one or more applications residing on said first host computer and also residing on said second host computer; and first programmable means for host identity takeover operating in said second host computer whereby, should said first host computer fail or be taken out of service, a first user of said first means for host identity takeover defines said first virtual IP address (VIPA) to be uniquely associated with said second host computer instead of said first host computer, thereby allowing said one or more remote computers to dynamically reroute access to said instance of said one or more applications residing on said first host computer to said second host computer without requiring a change to said instance or to a corresponding application executing on said remote computers.

10. The means for enabling as claimed in claim 9 whereby, when said first host computer recovers, said first user of said first means for host identity takeover in said second host computer the definition of said first virtual IP address (VIPA) from said second host computer.

11. The means for enabling as claimed in claim 10 whereby, when said first user of said first means for host identity takeover in said second host computer removes the definition of said first virtual IP address (VIPA), a second user of a second programmable means for host identity takeover operating in said first host computer defines said first virtual IP address (VIPA) to be uniquely associated with said first host computer instead of said second host computer, such that said one or more remote computers can resume communications with said instance of said one or more applications residing on said first computer.

12. The means for enabling as claimed in claim 9 wherein an OBEYFILE command is used to define said first virtual IP address (VIPA) to be uniquely associated with said second host computer.

13. The means for enabling as claimed in claim 10 or II wherein an OBEYFILE command is used to remove said definition of said first virtual IP address (VIPA) in said second host computer.

14. The means for enabling as claimed in claim 9, 10 or 11 wherein said first host computer contains multiple virtual IP addresses (VIPAs).

15. The means for enabling as claimed in claim 9, 10 or 11 wherein said second host computer contains multiple virtual IP addresses (VIPAs).

16. The means for enabling as claimed in claim 9, 10 or 11 wherein a TCP/IP routing protocol advertises a route to said first virtual IP address (VIPA).

17. For use in a computer network having at least one host computer and one or more remote computers, said host computer having at least two TCP/IP stacks operating therein, a method for enabling the host computer to provide backup functions for TCP/IP communications, said method for enabling comprising:

providing programmable means for defining a first virtual IP address (VIPA) for a first TCP/IP stack in said host computer, said first stack executing one or more applications, said means for defining enabling said one or more remote computers to access said one or more applications executed by said first stack by reference to said first virtual IP address (VIPA), wherein said first VIPA is not associated with a physical adapter in said host computer and wherein said first VIPA is uniquely associated with said first stack at a given time;

providing programmable means for defining a virtual address (VIPA) for a second TCP/IP stack in said host computer, said second stack for executing one or more applications, whereby said one or more remote computers in the network can access said one or more applications executable by said second stack by reference to said virtual IP address (VIPA);

providing an instance of one or more applications executable by said first stack and also executable by said second stack; and providing first programmable means for host identity takeover operating in said host computer whereby, should said first stack fail or be taken out of service, a first user of said first means for host identity takeover defines said first virtual IP address (VIPA) to be uniquely associated with said second stack instead of said first stack, thereby allowing said one or more remote computers to dynamically reroute access to said instance of said one or more applications executed by said first stack to said second stack without requiring a change to said instance or to a corresponding application executing on said remote computers.

* * * * *